(12) United States Patent
Bodmer et al.

(10) Patent No.: US 7,908,221 B2
(45) Date of Patent: *Mar. 15, 2011

(54) SYSTEM PROVIDING METHODS FOR DYNAMIC CUSTOMIZATION AND PERSONALIZATION OF USER INTERFACE

(75) Inventors: Brian Bodmer, Santa Cruz, CA (US); Paul Egli, Scotts Valley, CA (US); Elizabeth McCanlies, Aptos, CA (US)

(73) Assignee: VeriSign, Inc., Dulles, VA (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/206,727

(22) Filed: Sep. 8, 2008

(65) Prior Publication Data
US 2009/0013037 A1 Jan. 8, 2009

Related U.S. Application Data

(63) Continuation of application No. 10/125,049, filed on Apr. 17, 2002, now Pat. No. 7,424,459.

(60) Provisional application No. 60/361,752, filed on Mar. 1, 2002.

(51) Int. Cl.
*G06Q 99/00* (2006.01)
(52) U.S. Cl. ........................................... 705/64
(58) Field of Classification Search .............. 705/26–27, 705/51, 64–67, 74; 707/1–10, 100–104; 709/201; 715/500
See application file for complete search history.

(56) References Cited

U.S. PATENT DOCUMENTS

| | | | |
|---|---|---|---|
| 6,014,638 A | 1/2000 | Burge et al. | |
| 6,026,433 A | 2/2000 | D'Arlach et al. | |
| 6,065,120 A | 5/2000 | Laursen et al. | |
| 6,141,666 A | 10/2000 | Tobin | |
| 6,237,022 B1 | 5/2001 | Bruck et al. | |
| 6,327,628 B1 | 12/2001 | Anuff et al. | |
| 6,405,175 B1 | 6/2002 | Ng | |
| 6,480,885 B1 | 11/2002 | Olivier | |
| 6,564,251 B2 | 5/2003 | Katariya et al. | |
| 6,632,248 B1 | 10/2003 | Isacc et al. | |
| 6,662,199 B1 | 12/2003 | Flight et al. | |
| 6,694,482 B1 | 2/2004 | Arellano et al. | |
| 6,697,824 B1 | 2/2004 | Bowman-Amuah | |

(Continued)

FOREIGN PATENT DOCUMENTS
WO WO 02084524 A2 10/2002

OTHER PUBLICATIONS

Wright, "Wider Platform for the Workgroup", Jul. 13, 1994, PC User, n239, p. 54 (2), ISSN: 0263-5720.

(Continued)

*Primary Examiner* — Mary Cheung
(74) *Attorney, Agent, or Firm* — Blakely, Sokoloff, Taylor & Zafman, LLP; Judith A. Szepesi

(57) ABSTRACT

A system providing methods for dynamically generating personalized content is described. Specific items of content which may be personalized or customized are identified. Subdirectories are created for each value of such personalized content. Files specific to each value of personalized content are created and placed in these subdirectories. When a user requests a particular web page or item of content, a token is retrieved identifying the personalized content to be generated for that particular user. Personalized content is then dynamically generated by construction of a path to at least one subdirectory containing personalized content. The path to such subdirectory containing personalized content is dynamically constructed based upon the token identifying such personalized content.

16 Claims, 5 Drawing Sheets

U.S. PATENT DOCUMENTS

| | | |
|---|---|---|
| 6,732,152 B2 | 5/2004 | Lockhart et al. |
| 6,754,833 B1 | 6/2004 | Black et al. |
| 7,127,415 B1 | 10/2006 | Verchere |
| 2002/0010651 A1 | 1/2002 | Cohn et al. |
| 2002/0111942 A1 | 8/2002 | Campbell et al. |

OTHER PUBLICATIONS

Duncan, Ray, "Power Programming: An HTML Primer" PC Magazine, Jun. 13, 1995.

Extensible Markup Language (XML) 1.0 specification, www.w3.org., 2000.

Fielding, R., et al., "RFC 2616, Hypertext Transfer Protocol—HTTP/1.1" Jun. 1999.

Gosling, J. et al., "The Java Language Environment: A White Paper" Sun Microsystems Computer company, Oct. 1995.

Information Sciences Institute, "RFC 793: Transmission Control Protocol" Sep. 1981.

Java™ Servlet API Specification, Version 2.3, Sun Microsystems, Inc. Sep. 17, 2001.

Socolofsky, T. et al., "RFC 1180: TCP/IP Tutorial" Jan. 1991.

SYSTEM PROVIDING METHODS FOR DYNAMIC CUSTOMIZATION AND PERSONALIZATION OF USER INTERFACE

RELATED APPLICATIONS

The present application is related to and claims the benefit of priority of the following commonly-owned provisional application(s): application Ser. No. 60/361,752, filed Mar. 1, 2002, entitled "System Providing Methods for Dynamic Customization and Personalization of User Interface", of which the present application is a non-provisional application thereof, and is a Continuation of U.S. application Ser. No. 10/125,049, filed Apr. 17, 2002, entitled "System providing Methods for Dynamic Customization and Personalization of User Interface." The disclosure of the foregoing application is hereby incorporated by reference in its entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to electronic commerce and, more particularly, an improved system and methodology for dynamic customization and personalization of Internet content.

2. Description of the Background Art

An increasing volume of consumer and business transactions are today conducted on e-commerce sites rather than (or in addition to) face to face in traditional brick and mortar environments. Today's e-commerce sites and their operations are well known and understood. A typical e-commerce site, such as Amazon.com, has a catalog or list of products and services that are offered through the site. It also includes marketing and promotional materials that solicit orders for these products and services. After a customer enters the Web site, the customer uses a browser to view HTML pages containing product descriptions, marketing collateral, pricing, and other information. Most e-commerce vendors have made significant investments in their Web sites to provide a compelling user experience for their customers. A significant part of this effort is to provide customers with a consistent look and feel that enables users to better navigate the site and encourages these customers to remain on the vendor's site.

In order to retain customers and increase revenues, e-commerce vendors are also continually looking for ways to expand their sites by offering additional products and services. They endeavor to act as a "one-stop shop" providing a wide range of products and services to their customers. However, in expanding the scope of their offerings, these vendors must increasingly rely on third party suppliers as they do not have all of the necessary resources or capabilities to directly manufacture, process, and fulfill customer orders for all of this wide range of products and services. These e-commerce vendors can, of course, easily accept and fulfill orders for many third party products that they stock in inventory in the manner described above. For example, K-Mart, or its e-commerce arm Bluelight.com, may offer cameras and accessories from various manufacturers that K-Mart has purchased and has available in its inventory. In this case, K-Mart can accept and fulfill a customer order for a camera placed on its Bluelight.com Web site without the need for further interaction with its supplier and in a manner that is relatively transparent to the customer ordering these products.

However, in other cases the e-commerce vendor may not have the necessary capabilities or resources to independently accept and fulfill orders for certain third party products or services. This is particularly true in the case of orders for more complex products or services involving a large amount of customization by the customer. For example, assume that a retailer like K-Mart wants to offer photograph or image processing services for its customers in conjunction with the sale of cameras, film, and other accessories. K-Mart may not have a photo processing laboratory or the necessary processing equipment or expertise to directly provide photograph or digital image processing services and, thus, may need to outsource fulfillment. In the particular case of photo finishing, K-Mart and most other traditional "brick and mortar" retailers have historically served as middlemen in connection with the supply of photo processing services to their customers. These retailers often have "photo centers" where customers drop off film and later return to pick up prints (and perhaps also get copies of the prints as digital images on CD-ROMs). However the actual processing has been traditionally handled by laboratories such as Kodak that have the appropriate resources and expertise to better perform these services. A large number of similar situations exist in which both e-commerce and brick and mortar retailers prefer to outsource the supply of a particular product or service to a third party rather than to make the considerable investment necessary to develop their own offering. These types of custom orders for third party products and services can be very difficult for the e-commerce vendor to offer through its standard e-commerce site ordering and fulfillment systems as it has to balance and act as middleman between the requirements of its customers and the requirements of its supplier.

E-commerce vendors want to offer third party services to provide a broader offering to their customers. However these vendors also want to be able to offer these third party products and services in a manner that is customized to have a look and feel consistent with the vendor's own web site. In particular, these vendors want to be able to offer third party products and services in a manner that makes these products and services appear as a vendor-branded offering. Suppliers of these third party products and services are interested in fulfilling these requirements in order to meet the requirements of their e-commerce vendor partners/customers. However, these suppliers want to avoid developing and implementing separate offerings for every e-commerce vendor in view of the significant time, costs, and operating complexities involved. For example, a supplier may provide photo-processing services through dozens of different retailers. This supplier wants to be able to use the same systems and applications for each of these retailers, thereby avoiding the cost and expense of developing and implementing a custom offering for each retailer. The supplier also wants to be able to use the same hardware for multiple partners rather than to incur the expense of purchasing, installing, and supporting a separate hardware installation for each partner. At the same time, the supplier wants the ability to customize or personalize the user interface of the solution for particular retailers in order to make the supplier offering appear like a branded offering of its particular retailer customer.

One approach for using the same hardware to provide service to multiple partners is that of virtual hosting. Virtual hosting enables a company to use a third party to host its Internet Web site. Virtual hosting involves a server (computer and associated programs) at a third party location that is shared by multiple Web site owners so that each owner can use and administer the server as if it had control of its own server. Although virtual hosting enables one machine or cluster of machines to be shared by multiple customers, it does not avoid the requirement for each user to personalize (i.e., develop) its own custom user interface. Thus, considerable duplication of effort is still required to develop a personalized user interface for each partner or customer. Although virtual hosting enables the same back-end servers to be used for multiple partners, this approach still requires development and support of custom pages for each partner in order to conform to each partner's branding requirements. A supplier that is delivering similar services through multiple partners wants to avoid the delay and expense inherent in developing, implementing, and supporting a custom interface for each partner/customer.

Another approach that has been used to personalize Web pages is to "special case" pages or portions of pages to enable special requirements to be addressed. Special casing involves writing unique code to handle particular situations. In this context, special casing would be used to personalize particular text or graphics on a Web page depending, for example, on the source making the request for reviewing a particular item. Special casing pages may be a workable solution when a supplier has a very small number of partners. However, if the supplier has a larger number of partners this approach involves considerable development effort and results in a much more complex environment to maintain on an ongoing basis. For example, if the supplier wants to make changes to its offering, these changes may have to be rolled down into a number of different Web page segments for each of the various partners involved. For these reasons, special casing is not a cost-effective, long-term approach if the supplier has more than one or two partners.

What is required is an improved method for personalization of Web pages and other content to enable the same hardware and software environment to be used to deliver a personalized solution for multiple partners. Ideally, multiple partners would utilize the same environment, however this environment would generate Web pages and content with a personalized look and feel consistent with each partner's branding. This solution should be cost effective to implement and support on behalf of multiple partners, while individually branding each partner's offering. The present invention fulfills these and other needs.

GLOSSARY

The following definitions are offered for purposes of illustration, not limitation, in order to assist with understanding the discussion that follows.

HTML: HTML stands for HyperText Markup Language. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications. Further description of HTML documents is available in the technical and trade literature; see e.g., Ray Duncan, *Power Programming: An HTML Primer*, PC Magazine, Jun. 13, 1995, the disclosure of which is hereby incorporated by reference.

HTTP: HTTP stands for HyperText Transfer Protocol, which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HTTP is available in *RFC 2616: Hypertext Transfer Protocol—HTTP/1.1*, the disclosure of which is hereby incorporated by reference. RFC 2616 is available from the World Wide Web Consortium (W3), and is currently available via the Internet at http://www.w3.org/Protocols/. Additional description of HTTP is available in the technical and trade literature; see e.g., William Stallings, *The Backbone of the Web*, BYTE, October 1996, the disclosure of which is hereby incorporated by reference.

Java: Java is a general purpose programming language developed by Sun Microsystems. Java is an object-oriented language similar to C++, but simplified to eliminate language features that cause common programming errors. Java source code files (files with a .java extension) are compiled into a format called bytecode (files with a class extension), which can then be executed by a Java interpreter. Compiled Java code can run on most computers because Java interpreters and runtime environments, known as Java Virtual Machines (JVMs), exist for most operating systems, including UNIX, the Macintosh OS, and Windows. Bytecode can also be converted directly into machine language instructions by a just-in-time compiler (JIT). Further description of the Java Language environment can be found in the technical, trade, and patent literature; see e.g., Gosling, J. et al., *The Java Language Environment: A White Paper*, Sun Microsystems Computer Company, October 1995, the disclosure of which is hereby incorporated by reference.

JSP: JSP is an abbreviation of JavaServer Pages, a technology that allows web developers and designers to develop and maintain dynamic web pages that leverage existing business systems. JavaServer Pages technology uses XML-like tags and scriptlets written in the Java programming language to encapsulate the logic that generates content for a Web page. Additionally, the application logic can reside in server-based resources that the page accesses with these tags and scriptlets. Further description of JavaServer Pages can be found in the technical, trade, and patent literature, see e.g., *Java™ Servlet API Specification, Version* 2.3, Sun Microsystems Inc., Sep. 17, 2001, the disclosure of which is hereby incorporated by reference.

SKU: SKU stands for Stock Keeping Unit and is a number associated with a product for inventory control purposes. Each SKU identifies an individual product and each SKU is unique to the vendor of the product. As used herein, SKU refers broadly to any product identification scheme.

TCP: TCP is short for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., *RFC 793: Transmission Control Protocol, the disclosure of which is hereby incorporated by reference.*

TCP/IP: TCP/IP stands for Transmission Control Protocol/ Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., *RFC* 1180: *A TCP/IP Tutorial*, the disclosure of which is hereby incorporated by reference. A copy of RFC 1180 is currently available at ftp://ftp.isi.edu/in-notes/rfc1180.txt.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML is short for Extensible Markup Language, a specification developed by the W3C. XML is a pared-down version of SGML, designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (www.w3.org), the disclosure of which is hereby incorporated by reference. The specification is also currently available on the Internet at http://www.w3.org/TR/REC-xml.

SUMMARY OF THE INVENTION

The present invention includes a system providing methods for dynamically generating personalized content. The method commences with the identification of specific items of content which may be personalized or customized for a particular user, customer, or partner. Subdirectories are created to store each value of such personalized content. Next, files specific to each value of personalized content (e.g., files for each user, customer, or partner) are created and placed in these subdirectories. When a user requests a particular web page or item of content, a token is retrieved identifying the personalized content to be generated for that particular user. Personalized content is then dynamically generated by construction of a path to at least one subdirectory containing personalized content. The path to such subdirectory containing personalized content is dynamically constructed based upon the token identifying such personalized content. The personalized content may then be displayed to the user.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
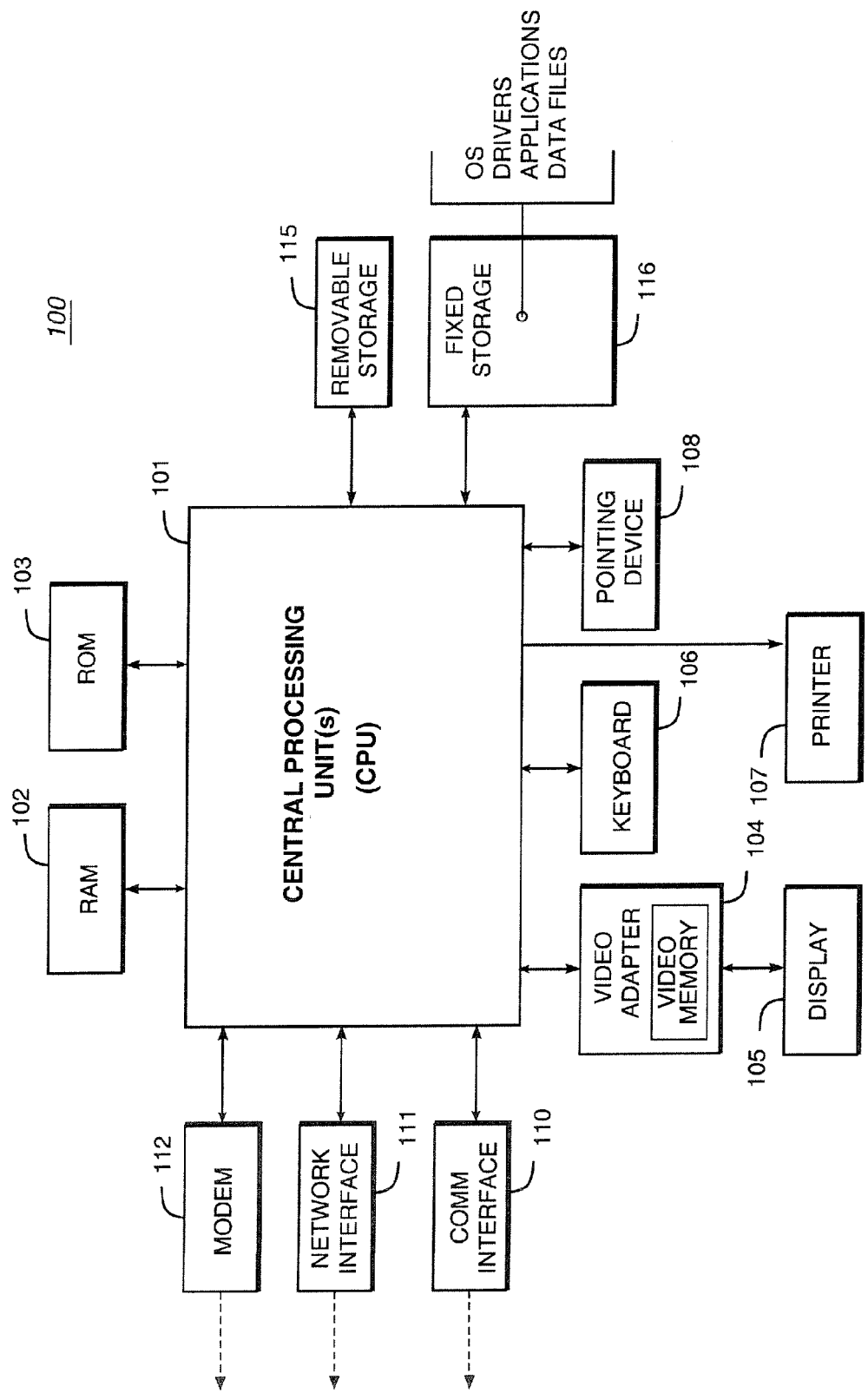
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, drivers, and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
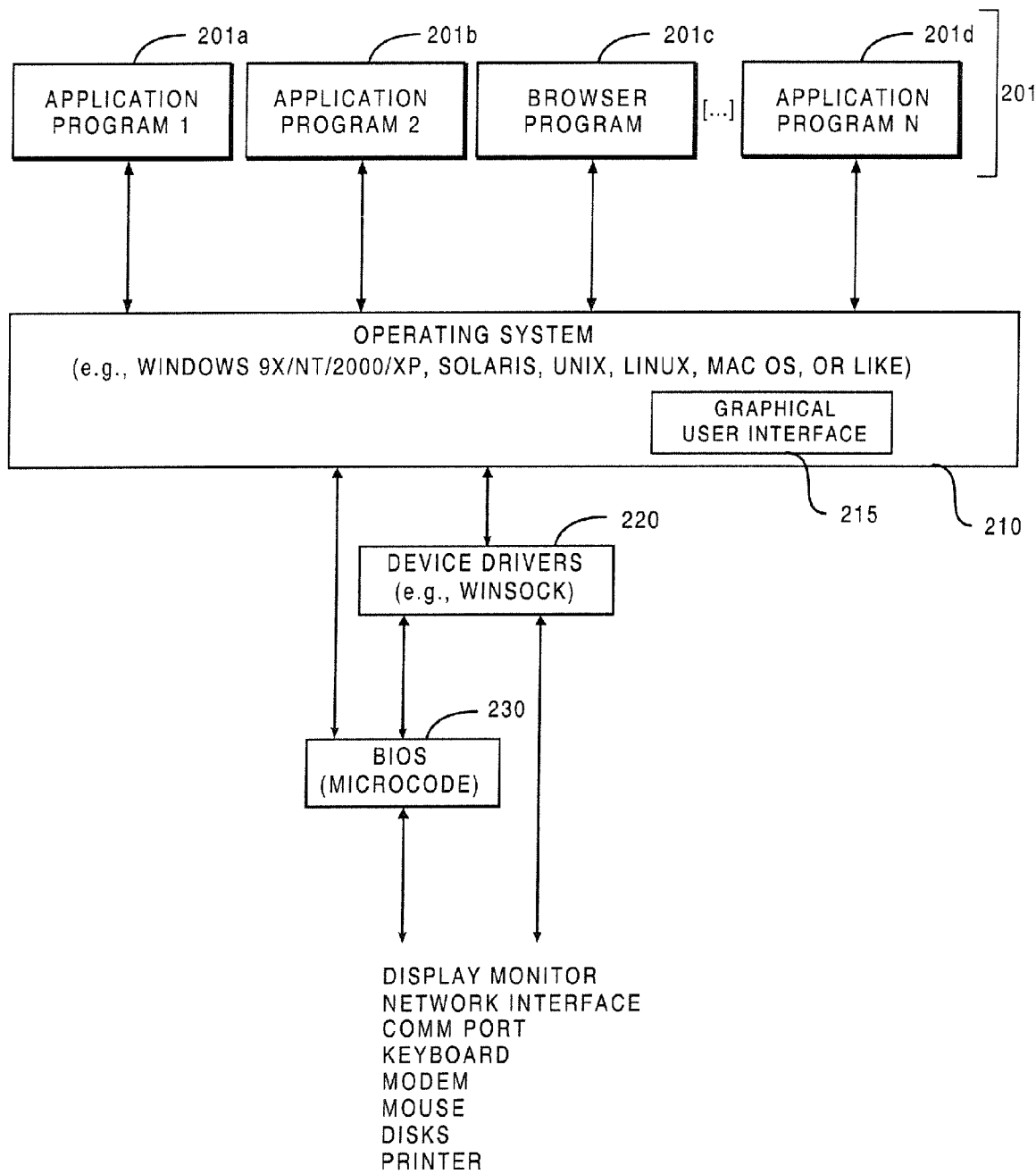
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., personal computers running Web browsers such as Microsoft Exchange or Netscape Navigator). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. Dynamic Customization and Personalization of Web Content

A. Overview

The present invention enables the same hardware and software environment to be leveraged and used to provide services for multiple partners or customers. The environment includes common Web page templates that are used to provide consistent core functionality to multiple partners or customers using the environment. These templates include specific areas that can be customized or personalized for each partner or customer. The present invention enables personalized content to be automatically and dynamically generated for each partner or customer by utilizing such party's own style, appearance, and branding. Personalized content, preferences, and settings of a particular partner or customer are stored and identified by a unique identifier. The unique identifier enables such partner's or customer's personalized content to be identified and dynamically generated when required. For example, a unique identifier may be associated with a particular partner that is the source of a request for viewing a particular Web page, enabling personalized content on such Web page to retrieved and dynamically generated for display to a customer of such partner. The structure of the pages presented to customers and the behavior of the Web service provided to different partners is similar, but the look and feel of Web content is personalized for each partner in order to present a style and appearance that is consistent with the partner's branding. For example, a Web page header and footer may be dynamically generated to reflect each partner's branding and style. The style and appearance of other portions of the Web page may also be customized for each partner. The same methodology allows particular products or services offered by a supplier to be selected (or deselected) based upon the partner involved.

A system developed using the methodology of the present invention is easy to implement and enables an offering to be rapidly and efficiently customized to serve multiple partners or customers. For instance, a single hardware and software environment can be used to provide a personally branded solution for multiple partners. Once implemented, the system is also easy to maintain and extend, as changes to style and appearance do not require review and replacement of special tags implemented in various different pages. Rather, personalized content can be easily modified or extended without changing the core components of the solution or requiring additional hardware or software.

Use of the present invention is not limited to use with Web pages. Rather the system and methods of the present invention may be used to customize various customer facing interfaces and items of content. For example, the present invention may be used to personalize e-mail messages and related content sent to (or on behalf of) end users. A system may include functionality for generating e-mail messages on behalf of a particular partner or customer (e.g., sharing of photographs or digital images). Using the methodology of the present invention, e-mail messages may be automatically personalized to utilize the partner's or customer's own branding and style. A personalized message may be constructed by using an e-mail template residing in the system which is customized based upon the partner's or customer's specific requirements. By providing a core template and the ability to customize certain attributes of a message, a system generated message (for example a message sent on behalf of a user to share photographs) can be personalized on behalf of a particular partner or customer. In this manner, the present invention may be used to provide such parties with additional marketing and branding opportunities.

B. Block Diagram of System Environment

Figure 3:
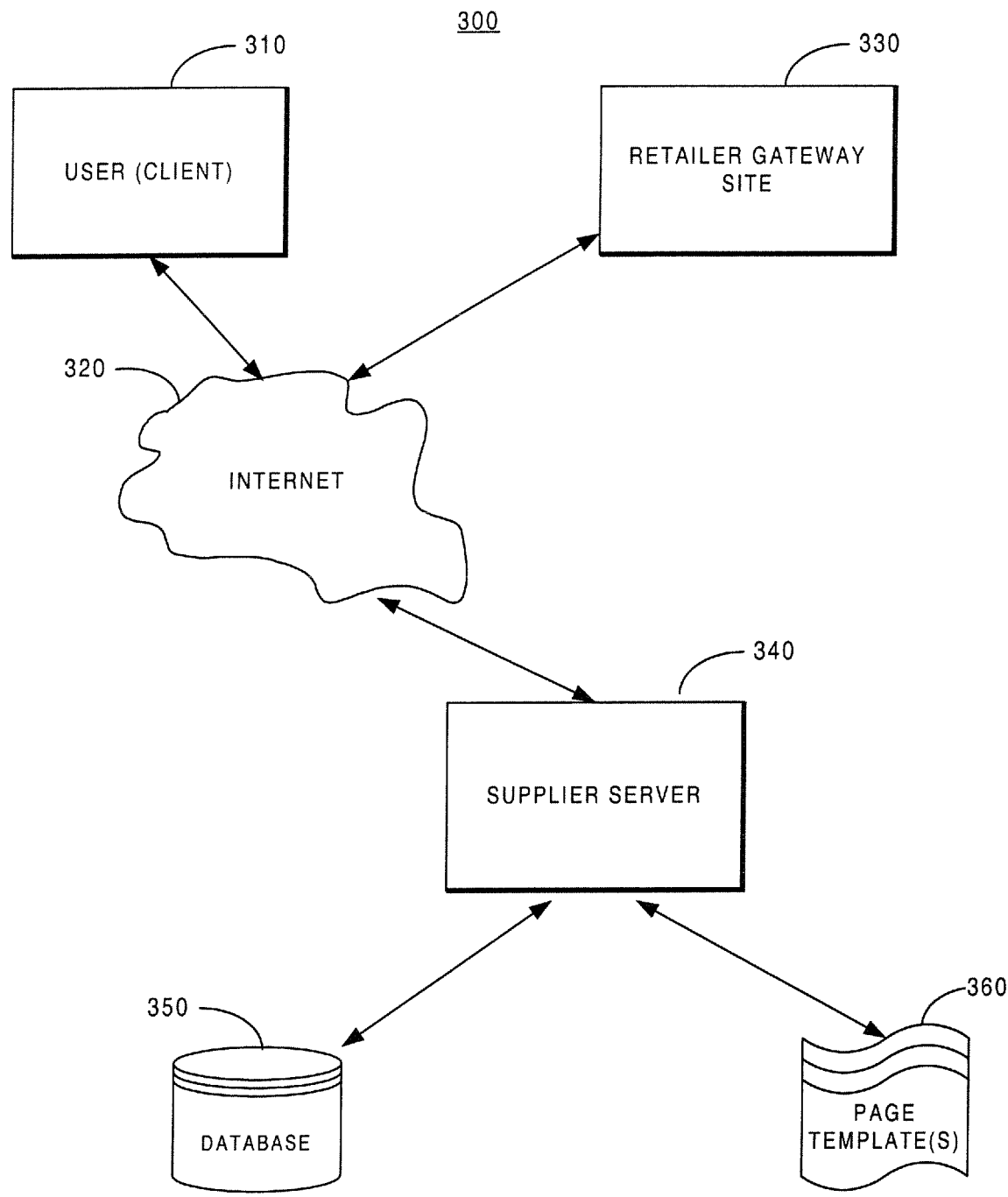
FIG. 3 is a block diagram illustrating a high-level view of an Internet commerce environment in which the present invention may be embodied.

FIG. 3 is a block diagram illustrating a high-level view of an Internet commerce environment in which the present invention may be embodied. For purposes of this discussion, an exemplary Internet commence environment involving a supplier providing services through multiple retail partners is described. However the methods of the present invention may also be used for dynamic personalization of content in various other situations. As shown, environment 300 includes an end user 310 connected via the Internet 320 to a partner (or gateway) site 330. The gateway site 330 is a Web site that is connected via the Internet (or another network) to a supplier server 340. As shown at FIG. 3, the supplier server 340 is connected to a database 350, and one or more page template(s) 360. Each of these components will now be described in greater detail.

The user 310 is a client, customer, or prospective customer, typically running Web browser software on a personal computer or a client device. As shown, the user 310 initially connects via the Internet 320 to the partner (gateway) site 330. The partner site 330 is typically an e-commerce Internet Web site that offers various products and services to customers via the Internet. Although a single user 310 is shown interacting with the partner site 330, typically multiple users would interact with the partner site 330 from time to time. The supplier server 340, which is operated by a third party supplier in an exemplary installation/deployment, contains information about particular products and services that are offered through multiple partners and associated applications for ordering and fulfillment of orders for such products and services. Although only a single partner (gateway) site 330 is shown at FIG. 3, a typical environment in which the present invention may be implemented includes multiple partner (gateway) sites 330 connected to each supplier server 340. For example, a photograph and digital image processing supplier may use one supplier server 340 to service customers of several different retail partners, each retail partner having its own gateway site 330. Thus, a typical e-commerce environment in which the invention may be utilized will include multiple partners, with each partner having multiple end user customers. The environment may also include multiple supplier server(s) 340. For instance, multiple supplier servers 340 may be used to provide different services, to service a larger number of partners, for load balancing, or for various other reasons. In addition, use of the present invention is not limited to use in conjunction with supplier offerings made through retail partners. Those skilled in the art will appreciate that the present invention may also be utilized for dynamic personalization of content in a variety of other circumstances.

The following example illustrates the utilization of the present invention in connection with the provision by a supplier of photo processing services through a retailer to a particular customer. In this example, a user 310 initially connects via the Internet with a gateway Web site 330 of a retailer, such as Bluelight.com. This retailer Web site 330 offers various goods and services, including photo processing services that are actually provided by a third party supplier, such as Kodak. When the user 310 browsing this partner (gateway) site 330 requests photograph processing services, this request is passed (redirected) by the gateway site 330 (e.g., the Bluelight.com site), together with an identifier indicating the source of the request, to the supplier server 340 for provision by the supplier (e.g., Kodak) of this particular service to the user 310.

The supplier server 340, in this exemplary embodiment, is a system that provides products and/or services to individual or business users. The supplier server 340 may, for instance, provide capabilities for displaying, transmitting, sharing, editing, and ordering photographic images in various formats. Although this example describes photographic images, various other types of products, services, data or information might be supplied in a back-end supplier system. As shown at FIG. 3, the supplier server 340 is connected to database 350 and one or more page templates 360. The database 350 contains various items of partner-specific information, and is accessed and used by the supplier server 340 to store and retrieve this information. The database 350 may be implemented on the same machine as the supplier server 340 or on a separate machine.

An identifier received by the supplier server 340 with the request forwarded by the gateway site 330 is used to retrieve a partner keyword (or token) from the database 350. The partner token enables the supplier server 340 to retrieve one or more Web page template(s) 360 and fill out these templates with partner-specific information obtained from the database 350 or retained locally on the supplier server 340. The supplier server 340 generates personalized Web pages and content from page template(s) 360 using this partner-specific information. Personalized pages and content may then be served back directly to the user 310. The personalized Web pages and content that are displayed to the user are branded and customized for the particular partner that is the source of the request (e.g., the partner associated with gateway site 330). The customized portion of the Web pages displayed to the user may include JavaServer Pages as well as other partner-specific items such as logos, graphics, and so forth. Particular styles and colors may also be applied to Web pages for consistency with the style of the partner's own Web content and branding. The partner token enables the supplier server 340 to retrieve partner specific information in order to dynamically generate customized/personalized Web pages from the Web page template(s) 360 and display these personalized Web pages to the user 310. At this point, the user 310 may interact directly with the supplier server 340 to obtain photograph processing services.

C. Operations of Supplier System for Dynamic Content Personalization

The operation of the present invention is probably best illustrated by example. The following discussion uses an example of a supplier that is providing photograph processing services through several retail partners. However, the present invention is not limited to being used in this context and those skilled in the art will appreciate that the present invention may also be used more generally in connection with various different types of products, services, and information that may be offered or displayed, directly or indirectly, to users.

Figure 4:
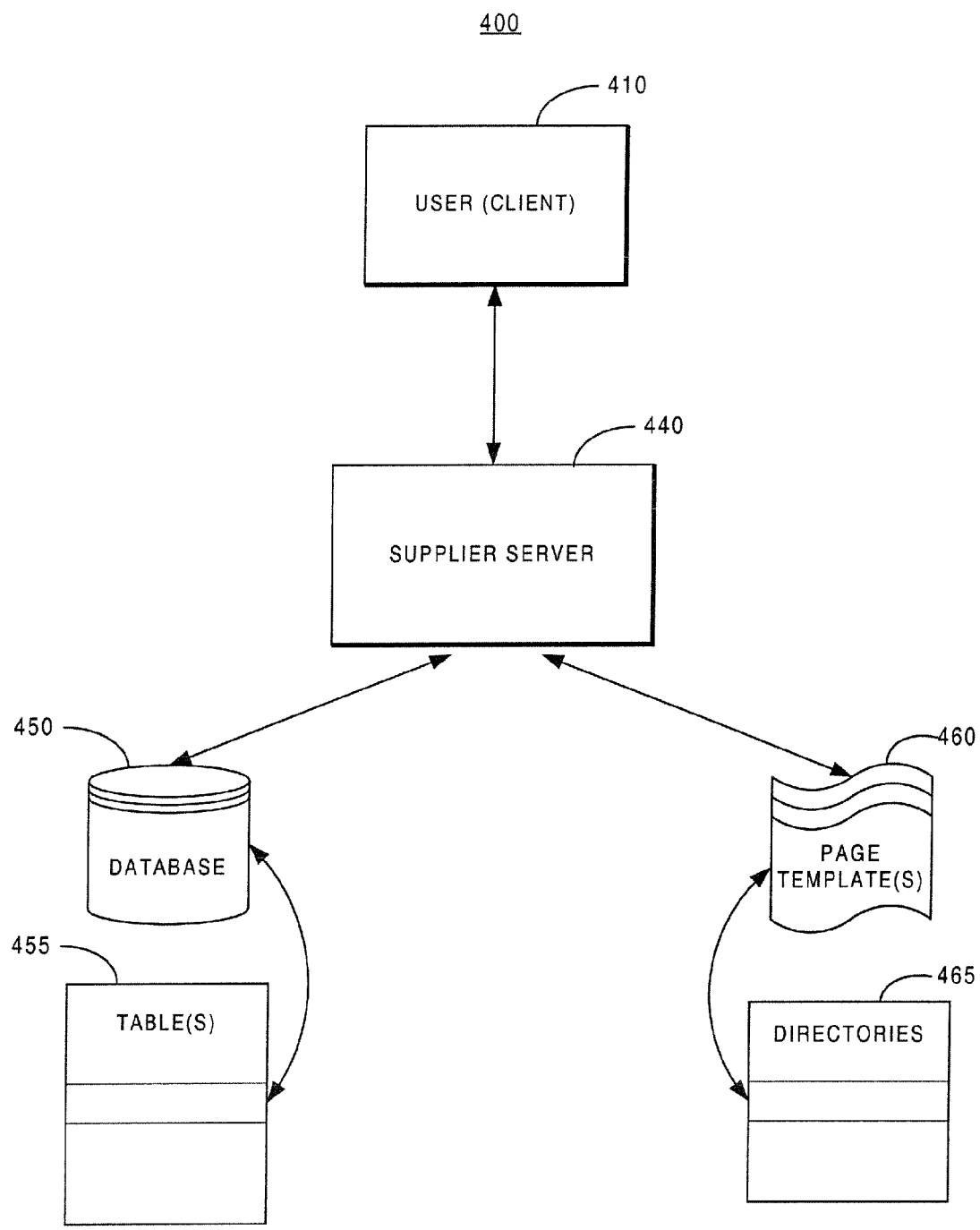
FIG. 4 illustrates the operation of an exemplary supplier system environment in which the present invention is embodied.

An exemplary supplier system environment 400 illustrating the operation of the present invention is shown at FIG. 4. Environment 400 includes a user 410, a supplier (or photo service) server 440, a database 450, and one or more page template(s) 460. As shown at FIG. 4, the database 450 may also contain one or more database table(s) 455 containing partner specific information. Also as shown, one or more directory(ies) 465 are associated with the web page template(s) 460. The operations of the supplier server 440 in dynamically generating personalized content will now be described in greater detail.

As described above, the user 410 typically connects initially with a gateway site (not shown). After browsing the gateway site, the user 410 may request a service (e.g., photograph processing services) provided by a third party supplier. This request by the user 410 is redirected to the supplier server 440 as previously described. When the (redirected) user request is received by the supplier server 440 for display of a particular web page or item of content, the request is examined to determine the partner that is the source of the request. An identifier received by the supplier server 440 with the request is used to retrieve a partner keyword (or token) from the database 450. The partner token that is retrieved by the supplier server 440 is retained in cache memory and associated with the user session. In addition to partner tokens, the database 450 may also include other partner-specific information. As shown at FIG. 4, the database 450 may include partner-specific information in one or more table(s) 455. Partner-specific information in the database 450 may include items such as a particular partner's pricing for certain products and services, the partner's e-mail addresses to be utilized as the "from" address for sending communications to customers, and so forth. Partner-specific information may also include partner style sheets, color preferences, and other preference and settings of each partner. These various items of partner-specific information may be retrieved by the supplier server 440 from the database 450 when required in construction of personalized Web pages or content. Alternative, items of partner-specific information may be retrieved from the database 450 upon initial connection or login and associated with a session.

After the token and related partner-specific information has been retrieved by the supplier server 440, it may be used for generating customized content to be returned or displayed to the user 410. Typically, the supplier server 440 generates a response to a user request by constructing a Web page to serve back to the user (e.g., user 410 requesting photograph processing services). The supplier server 440 starts with one or more appropriate Web page template(s) 460 and uses the token and/or partner-specific information as a key for dynamically generating custom portions of such Web page(s) (and/or other content) for a particular partner. The web page template(s) 460 provide standard content and functionality for particular supplier product and service offerings that are made available through multiple partners. For example, the same application for displaying digital images and permitting a user to send them to family and friends may be made available to multiple partners. The web page templates for this application will have core segments that are not modified for each partner. However, these page template(s) 460 also include certain locations (customizable portions) for insertion of partner-specific content. This may, for example, involve inserting the partner name into a particular location on the Web page. It may also involve using a token to retrieve and apply other partner specific content such as images, style sheets, and logos.

The supplier server 440 uses tags (or placeholders) on web page template(s) 460 together with the partner token to retrieve partner-specific preferences, settings, images, logos, or information which may reside locally on the supplier server 440 or, alternatively, may be stored in the database 450. For example, information on product pricing for a particular partner may be stored in the database 450 while logos, images, color preferences, and other items may be stored locally on the supplier server 440. When required, pricing information may be retrieved from the database 450, inserted into a web page that is being constructed, and displayed to the user. Alternatively, partner preferences and settings associated with a session may be retrieved, as described in more detail below, and used to construct the path for the location of the appropriate files from a particular directory (e.g. from directory(ies) 465) which resides locally on the supplier server 440. For example, a partner's color preferences may be retrieved from the database 450 upon login and associated with a session. As pages are requested, the partner preferences are retrieved from the session and used to construct a path to the appropriate subdirectory including the preferred color scheme. This enables a page to be generated in the color scheme selected by the partner.

As shown at FIG. 4, multiple web page template(s) 460 may reside on the supplier server 440. Typically a plurality of directories 465 reside underneath each of these web page template(s) on the supplier server 440. These directories may include one (or more) of the following: JSP (java server page) files that may be called up and included in a Web page that is being generated from a core template, images (such as logos, pictures, etc.), and includes (e.g. style sheets which enable particular colors, fonts, etc. to be applied to a Web page template). In this manner a large percentage of the content of particular pages may be standardized and contained in the generic (or core) Web page template(s) 460 which are used to provide the core elements of the application or service to multiple partners or customers. However, portions of the page templates provide for customization by containing tags or placeholders that are mapped to partner-specific or customer-specific content based upon the token or preferences and settings associated with a session or stored in the database 450. A particular template may, for instance, include a generic placeholder for an image or logo. This placeholder may be dynamically replaced at runtime with a partner-specific or customer-specific image that is obtained from an image directory based upon the generic placeholder (tag) and the partner or customer token.

The methodology of the present invention provides greater efficiency as the core functionality and a major portion of the content of a given Web page may remain uniform, while a relatively smaller portion of the content is generated dynamically to provide a personalized appearance to the page. This also results in a service that is easier to support. For example, if a supplier wishes to make a change to a core part of the page, only one core page needs to be changed and the change will be reflected in the personalized pages of all partners or customers. This is in contrast to prior art virtual hosting systems which would require multiple separate partner-specific web pages to be changed in order to implement a change to the core functionality. The laborious task of special-casing every element of a web page to provide for example (if partner name is X, do A, if partner name is Y, do B, etc.) is also avoided.

All the core routines doing all the heavy work reside in the core portion (generic or core directories of the application). If there is a bug in the application, this makes it easier to find/fix the error. The header, footer, style or theme, and particular images are pulled in from a subdirectory (or lower level) to customize particular segments of a page. This enables all of the core pages (and their functionality) to remain the same, while providing personalized branding for multiple partners. As a result the system is easier to support. The supplier is not required to maintain multiple sets of pages for its various partners or customers.

An example illustrating the use of the methodology of the present invention is a sales promotion. If the promotion is the same for multiple partners, it can be branded differently for each of them. Alternatively, if the promotion is only active for one partner, then the promotional banner may be generated and displayed only for that particular partner without impacting the core functionality provided to other partners. Another area in which customization is often required is that of pricing and product availability. Different prices may be utilized by different retailer partners. Products that are available (offered) may also differ amongst partners. In these situations, custom information may be stored in a database as previously described. For example, pricing for particular products (organized by product Stock Keeping Unit or "SKU") for a particular partner may be stored in a table and retrieved from the database when required based upon the partner token. In this manner the same product SKUs may be used for multiple partners, while allowing each of the partners to customize the pricing of these items to their customers. The combination of partner token and product SKU allows retrieval of the pricing to be displayed to a customer of a particular partner. As this type of pricing information is retrieved less frequently, an administrator may elect to store the information in a database (e.g., the database 450) rather than retain the information in system memory. However, pricing information could alternatively be retained locally in system memory (e.g., on supplier server 440).

The same approach may also be used for e-mail templates. Using the methodology of the present invention, e-mail templates may be constructed with standardized content and tags or placeholders for insertion of customized content. This may, for example, include system generated e-mail messages, such as an e-mail message sent by a service on behalf of a user to share photographic images. The message may be personalized to indicate the retailer providing the service, the retailer's reply e-mail address, the retailer's Web site for ordering copies of the photos, and so forth. This provides another opportunity for branding of the retailer's offering to customers and potential customers.

D. Dynamic Generation of Customized Content

Figure 5:
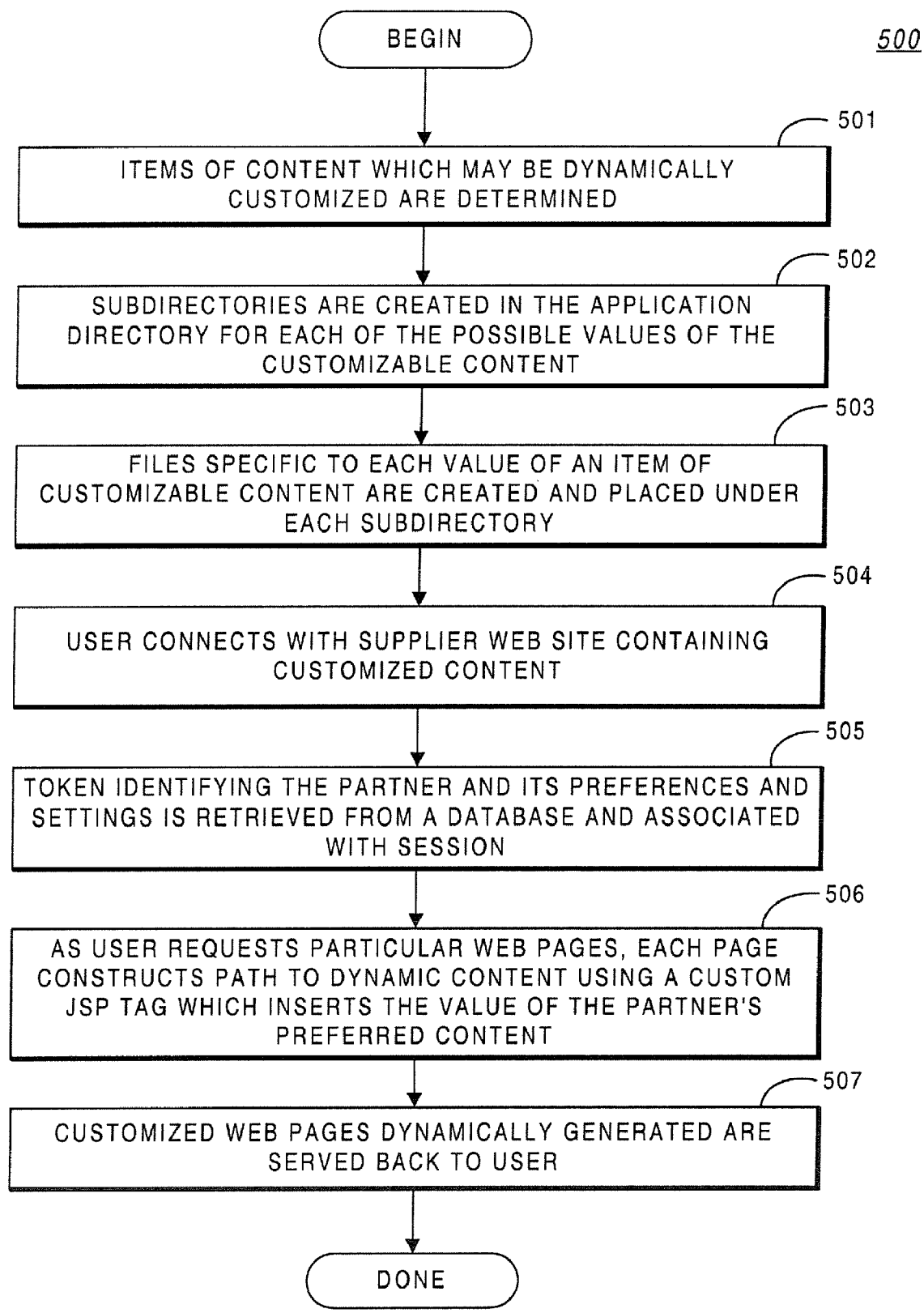
FIG. 5 is a flowchart illustrating the detailed method steps of a system constructed in accordance with the present invention in generating personalized content.

FIG. 5 is a flowchart illustrating the detailed methods of a system constructed in accordance with the present invention in dynamically generating personalized content. The following discussion uses the same example of a supplier Web site providing photograph processing services through multiple retail partners. Those skilled in the art will appreciate, however, that the present invention is not limited to this context and that it may also be used in a wide variety of different environments and circumstances.

The method commences, at step 501, with a determination the specific items of content of a particular supplier Web site which may be dynamically customized (or personalized) based upon characteristics or preferences of the supplier's partners/customers. As previously described, a supplier Web site providing photograph and image processing services may offer the same core functionality through multiple retailer partners. The core functionality of the supplier's Web application will remain the same for each of these partners. However, an administrator or developer may designate specific portions of the content of the Web site that may be customized based upon partner preferences. For example, partners may have the option of selecting particular colors.

At step 502, directories are created in the Web application directory for each of the possible values of the customizable content. In this example of selecting a color, the directories created include the following: <appdir>/colors/PARTNER_1; <appdir>/colors/PARTNER_2; and <appdir>/colors/PARTNER_3. Next, at step 503, files specific to each value of an item of dynamic content are created and placed under each of these subdirectories. Each of the files is specific to a particular value of the dynamic content and each of the files is named identically underneath the subdirectories. For example, each color scheme may be defined by a cascading style sheet (CSS) document named "global.css". The following files are created to implement the above color scheme selections: <appdir>//colors/PARTNER_1/global.css; <appdir>//colors/PARTNER_2/global.css; and <appdir>//colors/PARTNER_3/global.css. Each of these files contains specific colors to be utilized for each of the three partners. The following example illustrates an example of a JSP page using the directory structure that has been created:

```
<%@ page language='java' session='true' %>
<%@ taglib uri='WEB-INF/tlds/userprefs.tld' prefix='x' %>
<html>
<head>
<title>Example Customized Page</title>
<!--
    This example assumes that the site administrator has created a
    subdirectory called "colors" underneath the document root and
    a set of directories under "colors" for each possible value
    of the "color-scheme" user preference. If there are three
    different partners, the color schemes for each partner may be
    named "PARTNER_1", "PARTNER_2", and "PARTNER_3", and
    the directory structure would be:
        <document-root>/colors/PARTNER_1
        <document-root>/colors/PARTNER_2
        <document-root>/colors/PARTNER_3
    Underneath each of these directories, the administrator places
    a file named "global.css". The contents of the global.css
    file are specific to the color scheme named by the parent
    directory. For example:
    PARTNER_1/global.css:
    P { color: yellow }
    PARTNER_2/global.css:
    P { color: orange }
    PARTNER_3/global.css:
    P { color: lightblue }
    These CSS declarations set the color of the HTML text to yellow
    when set to the "PARTNER_1" color scheme, orange when set to
    "PARTNER_2", and light blue when set to "PARTNER_3".
    The custom JSP tag <x:user-prefs name='retail-partner'> reads the
    partner name that was established at login time from the session
    and inserts its value into the HTML. The tag also allows a
    default value to be specified.
-->
<link rel="stylesheet" href="/colors/<x:user-prefs name='retail-partner'
default='PARTNER_1'/>/global.css" type="text/css">
</head>
<body>
<p>
</p>
</p>
</body>
</html>
```

As shown above, subdirectories for each of the items of customized content (e.g., three color selections) are created and files including the custom values (e.g., colors yellow, orange, and light blue) are placed into these subdirectories under a particular Web application. The dynamic generation and serving of customized content to a particular user will now be described.

At step 504, a user connects with the supplier Web site including the particular Web application containing the customized content. The user may connect initially with a partner gateway site and request a service (e.g., photograph processing services) provided by a third party supplier. In this event, the user is redirected by the partner gateway site to the supplier Web site. Alternatively, an end user customer may login directly to the supplier Web site. At step 505, a token identifying the partner and its preferences and settings is retrieved from a database and associated with the HTTP session. A particular partner token may be retrieved based upon the source of the redirected request or as a result of information obtained during user login. This partner token (or name) that is associated with the session may be used to retrieve particular preferences and settings from the database when required. Alternatively, preferences and settings may be retrieved from a database and stored in the Web application's HTTP session on login (i.e., at the same time as retrieval of the partner token) to avoid having to subsequently retrieve this information.

As the user requests particular Web pages, at step 506, each page which contains dynamic (customized) content constructs the path to the dynamic content using a custom JSP tag which inserts the value of the partner's preferred content. In this example, the path to the color scheme-specific CSS stylesheet is constructed as follows:

```
<link rel="stylesheet" href="/colors/<x:user-pref name='retail-
    partner' default='PARTNER_1'/>/global.css" type="text/css">
```

If the user preference is set to "PARTNER_3", the JSP code above is replaced with the following HTML:

```
<link rel="stylesheet" href="/colors/PARTNER_3/global.css"
    type="text/css">
```

As described above, a partner's token is typically associated with the session. Other partner-specific information, such as preferences or settings, may also be associated with the session or stored in a database. The following illustrates, in the presently preferred implementation in the Java language, a method for retrieval of partner preferences from a session:

```
 1:  import java.io.*;
 2:
 3:  import javax.servlet.http.*;
 4:  import javax.servlet.jsp.*;
 5:  import javax.servlet.jsp.tagext.*;
 6:
 7:
 8:  /**
 9:   * Output a property stored in the session to the JSP page
10:   */
11:  public class UserPropertyTag extends TagSupport {
12:      private String name = null;
13:
14:      /**
```

-continued

```
15:   * Sets the name of the property to retrieve.
16:   *
17:   * @param name
18:   */
19:  public void setName(String name) {
20:      this.name = name;
21:  }
22:
23:  public void doStartTag( ) throws JspException {
24:      Object value =
              pageContext.getSession( ).getAttribute(name);
25:
26:      try {
27:          JspWriter out = getPreviousOut( );
28:          out.print(value != null ? value.toString( ) : "");
29:      }
30:      catch (java.io.IOException e) {
31:          throw
              new JspTagException("Unexpected IOException");
32:      }
33:  }
34: }
35:
36:
```

As shown at lines 19-20, the above method first sets the name of the particular custom attribute (property) to be retrieved. This particular attribute is then retrieved from the session as shown at lines 23-28 above.

Personalized Web pages and/or content dynamically generated as described above may then, at step 507, be served back to a user in response to a request. At this point, the user may interact with supplier Web site the above steps may be repeated for display of additional pages and items of content.

Although the foregoing example refers to applying different colors for various retail partners of a supplier, the same methodology may be used for various different types of content and in a variety of different situations. For example, the approach may be used to change switch images and logos as well as style sheets and colors. Also, one partner site may include images or logos from a directory named "/retailers/partner1/images" while a second partner site may references images in a directory named "/retailers/partner2/images." The same approach may be used to include blocks of HTML and content specific to each retail partner of the supplier. The methodology of the present invention may also be used to permit customization of content for particular users, rather than retail partners, in a similar manner to that described above.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method comprising:
   receiving a request for information by a server, the request being associated with a unique identifier that corresponds to an internet site from which the request was received;
   identifying a web page template having a core portion that includes content that remains uniform regardless of the internet site from which the request was received and a customizable portion that includes partner specific content that changes based upon an identity of the internet site from which the request was received, wherein the core portion is larger than the customizable portion;

using the unique identifier to retrieve partner specific settings and preferences to include in the customizable portion of the template; and generating a web page (or user interface) using the core portion, the customizable portion and the partner specific settings and preferences.

2. The method of claim 1, wherein the user interface includes an email.

3. The method of claim 1, wherein the web page has a personalized look and feel consistent with the internet site from which the request was received.

4. The method of claim 1, further comprising:

receiving new partner specific settings and preferences that are associated with the unique identifier; and generating a new web page (or new user interface) using the core portion, the customizable portion and the new partner specific settings and preferences.

5. The method of claim 1, wherein the request is received by the server subsequent to the internet site receiving a service request for a service provided by the server.

6. A computer readable medium including instructions that, when executed by a processor, cause the processor to perform a method comprising:

receiving a request for information by a server, the request being associated with a unique identifier that corresponds to an internet site from which the request was received;

identifying a template having a core portion that includes content that remains uniform regardless of the internet site from which the request was received and a customizable portion that includes partner specific content that changes based upon an identity of the internet site from which the request was received, wherein the core portion is larger than the customizable portion;

using the unique identifier to retrieve partner specific settings and preferences to include in the customizable portion of the template; and generating user viewable content using the core portion, the customizable portion and the partner specific settings and preferences.

7. The computer readable medium of claim 6, wherein the user viewable content includes a web page, and wherein the template is a web page template.

8. The computer readable medium of claim 6, wherein the user viewable content has a personalized look and feel consistent with the internet site from which the request was received.

9. The computer readable medium of claim 6, further comprising:

receiving new partner specific settings and preferences that are associated with the unique identifier; and generating new user viewable content using the core portion, the customizable portion and the new partner specific settings and preferences.

10. The computer readable medium of claim 6, wherein the request is received by the server subsequent to the internet site receiving a service request for a service provided by the server.

11. A computing apparatus comprising:

a memory including instructions for generating user viewable content; and a processor, connected with the memory, to execute the instructions, wherein the instructions cause the processor to perform a method comprising:

receiving a request for information by a server, the request being associated with a unique identifier that corresponds to an internet site from which the request was received;

identifying a template having a core portion that includes content that remains uniform regardless of the internet site from which the request was received and a customizable portion that includes partner specific content that changes based upon an identity of the internet site from which the request was received, wherein the core portion is larger than the customizable portion;

using the unique identifier to retrieve partner specific settings and preferences to include in the customizable portion of the template; and generating the user viewable content using the core portion, the customizable portion and the partner specific settings and preferences.

12. The computing apparatus of claim 11, wherein the user viewable content includes a web page, and wherein the template is a web page template.

13. The computing apparatus of claim 11, wherein the user viewable content has a personalized look and feel consistent with the internet site from which the request was received.

14. The computing apparatus of claim 11, the method further comprising:

receiving new partner specific settings and preferences that are associated with the unique identifier; and generating new user viewable content using the core portion, the customizable portion and the new partner specific settings and preferences.

15. The computing apparatus of claim 11, wherein the request is received by the server subsequent to the internet site receiving a service request for a service provided by the server.

16. A computing apparatus comprising:

a network interface to receive a request for information, the request being associated with a unique identifier that corresponds to an internet site from which the request was received;

a memory to store a plurality of templates, each of the plurality of templates having a core portion that includes content that remains uniform regardless of the internet site from which the request was received and a customizable portion that includes partner specific content that changes based upon an identity of the internet site from which the request was received, wherein the core portion is larger than the customizable portion, the memory further to store instructions for generating user viewable content; and a processor, connected with the memory and the network interface, to execute the instructions, wherein the instructions cause the processor to perform a method comprising:

identifying one of the plurality of templates;

using the unique identifier to retrieve partner specific settings and preferences to include in the customizable portion of the identified one of the plurality of templates; and generating user viewable content using the core portion, the customizable portion and the partner specific settings and preferences.

* * * * *